United States Patent [19]

Anderson et al.

[11] 4,173,823
[45] Nov. 13, 1979

[54] RESISTANCE HEATER FOR A PIZZA CARTON

[75] Inventors: Thomas L. Anderson, Neenah; Glenn A. Rasmussen, Larsen; Gerald J. Van Handel, Neenah, all of Wis.

[73] Assignee: American Can Company, Greenwich, Conn.

[21] Appl. No.: 918,690

[22] Filed: Jun. 23, 1978

Related U.S. Application Data

[62] Division of Ser. No. 816,444, Jul. 18, 1977, Pat. No. 4,134,004.

[51] Int. Cl.$^2$ .............................................. H01C 7/00
[52] U.S. Cl. ........................................ 29/611; 29/619; 29/620
[58] Field of Search ......................... 29/611, 619, 620; 219/345, 543, 522; 338/307, 308, 309

[56] References Cited

U.S. PATENT DOCUMENTS

| | | | |
|---|---|---|---|
| 2,843,711 | 7/1958 | Crick | 338/308 |
| 2,882,377 | 4/1959 | Rinehart | 338/307 |
| 2,961,522 | 11/1960 | Hammer | 219/543 |
| 3,296,415 | 1/1967 | Eisler | 219/523 |
| 3,721,803 | 3/1973 | Distefano | 219/524 |
| 3,737,624 | 6/1973 | Eilenberger | 219/345 |
| 3,766,644 | 10/1973 | Davis | 29/611 |
| 3,790,752 | 2/1974 | Boaz | 219/522 |
| 3,874,763 | 4/1975 | Hoover | 339/91 R |
| 4,115,917 | 9/1978 | Charon | 29/611 |

Primary Examiner—Francis S. Husar
Assistant Examiner—Gene P. Crosby
Attorney, Agent, or Firm—Robert P. Auber; Ira S. Dorman; Harry W. Hargis, III

[57] ABSTRACT

In the fabrication of a resistance heater for a carton for packaging a pizza, an aluminum metallized sheet is adhered to a paperboard panel, a generally U-shaped strip of arc-sprayed zinc is applied to three edge portions of the upwardly facing electrically conductive metal layer of the metallized sheet, the interconnecting portion of the U-shaped strip and the immediately underlying metal layer are severed, and the metal layer is severed along a line extending adjacent the same interconnecting portion to the side thereof enclosed by the U-shaped strip, so that each of the severed sections of the interconnecting portion serves as a terminal for a corresponding leg portion of the U-shaped strip comprising the electrodes for the intermediate region of the metallized sheet.

4 Claims, 5 Drawing Figures

RESISTANCE HEATER FOR A PIZZA CARTON

This is a division of application Ser. No. 816,444, filed July 18, 1977, now U.S. Pat. No. 4,134,004, issued Jan. 9, 1979.

BACKGROUND OF THE INVENTION

This invention relates to packaging, and more particularly to an improved package for prepared hot foods, including heater means and a method for its manufacture.

So-called take-out food restaurants have gained wide acceptance, and a popular food item is pizza. Characteristically, pizza is served at elevated temperatures that are difficult to maintain while it is being transported, frequently by automobile, from its place of purchase to its place of consumption.

It is a general objective of this invention to provide improved means for conveniently transporting foods at elevated, ready-to-serve temperatures.

It is a further and more specific objective to provide an improved pizza carton and heater means for use therewith.

It is a still further objective of the invention to provide novel heater means adaptable for use in combination with a conventional pizza carton.

The invention has as a further objective a novel method for the manufacture of an electrical resistance heater.

It is another objective of the invention to provide heater means of any of the aforementioned types that is capable of being energized through the cigarette lighter terminal of an automotive electrical circuit.

A still further objective of the invention is to provide an inexpensive, dispensible heater means of any of the aforementioned types.

SUMMARY OF THE INVENTION

In achievement of the foregoing as well as other objectives and advantages, the invention contemplates, in its apparatus aspect, a carton having at least a bottom wall portion and a side wall portion extending transversely of the former, means defining an opening in said side wall portion, and electrical heater means extending over said bottom wall portion and including electrical terminal means disposed in registry with said opening and presented for releasable engagement with electrical connector means insertable through said opening to supply electrical energy for said heater means.

In its method aspect, the invention contemplates fabrication of the heater means by forming a sheet of electrically resistive material, laying down a conductive strip on said resistive material, said strip having mutually spaced substantially parallel portions and an interconnecting portion, and converting said parallel strip portions into electrodes for said electrically resistive material and said interconnecting strip portion into terminals for said electrodes by severing said interconnecting portion and the immediately underlying resistive material, and severing said resistive material along a region adjacent said interconnecting strip portion and to the side thereof disposed between said parallel strip portions.

The manner in which the foregoing as well as other objectives and advantages of the invention may best be achieved will be more fully understood from a consideration of the following description, taken in light of the accompanying drawing.

DESCRIPTION OF THE PREFERRED EMBODIMENT

Figure 1:
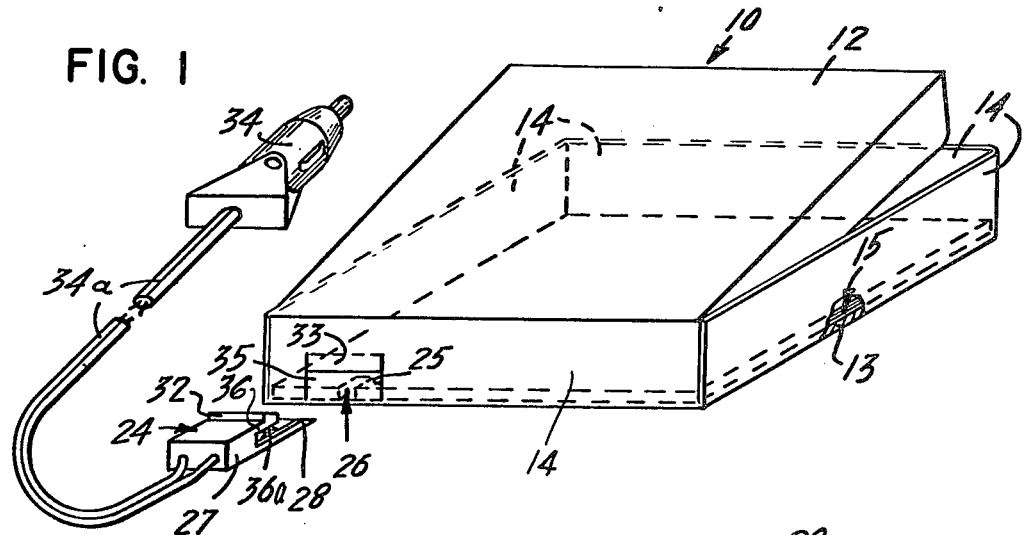
FIG. 1 is a partially exploded perspective view of carton and heater structure embodying the invention, with a portion broken away and the carton cover in partially opened position for convenience of illustration.
Figure 2:
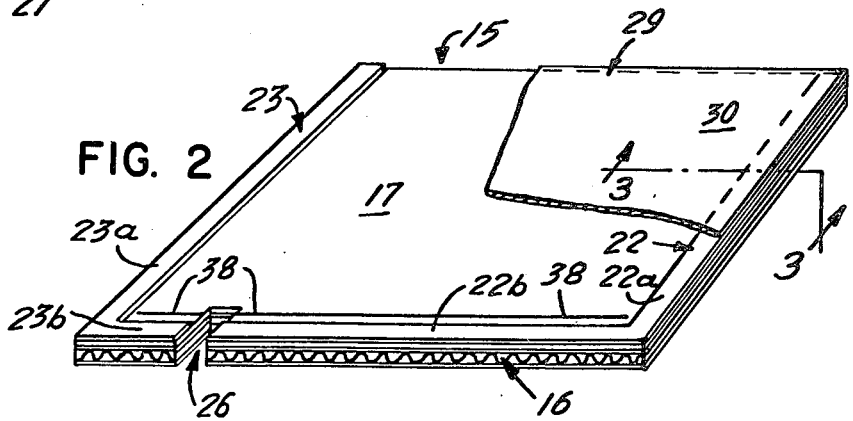
FIG. 2 is a perspective showing of the heater removed from the carton seen in FIG. 1.
Figure 3:
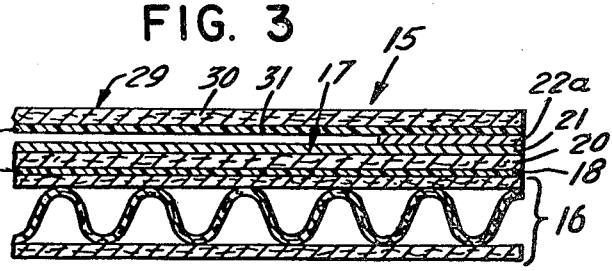
FIG. 3 is a sectional showing of the heater taken along the lines indicated generally by arrows 3—3 applied to FIG. 2.

With reference first to FIG. 1, a container and heater combination contemplated by the present invention comprises a carton 10, of paperboard or the like, for packaging food, such as, for example, a pizza (not shown), and including spaced confronting top and bottom wall portions 12 and 13, respectively, and side wall portions 14. With reference also to FIGS. 2 and 3, a resistance heater assembly 15 contemplated by the invention comprises a corrugated paperboard panel 16 having laminated thereto, by an adhesive 18, a sheet 17 comprising a layer of paper 20, such as, for example, glassine, provided with a vacuum-metallized layer 21 of aluminum. Further to heater assembly 15, a pair of bus bars 22, 23 extend over, and are disposed in electrical contact with, metallized layer 21. Confronting portions 22a, 23a of the bus bars serve as electrode means for conducting electricity through intermediate portions of layer 21 as the resistor element.

Figure 4:
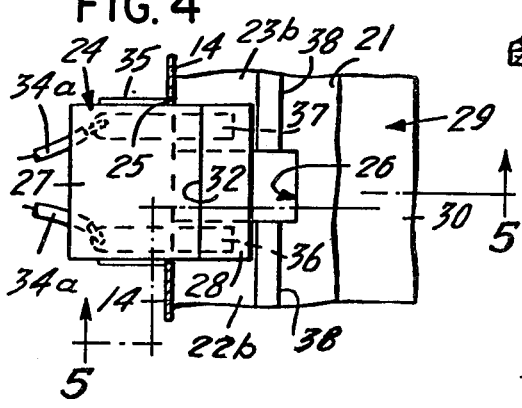
FIG. 4 is a plan showing a terminal dip inserted into the carton.
Figure 5:
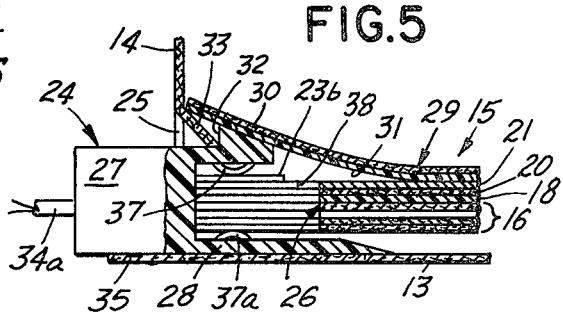
FIG. 5 is a view looking in the direction of arrows 5—5 applied to FIG. 4.

With reference to FIGS. 4 and 5, extended aligned portions 22b, 23b of the bus bars serve as terminals through which electrical energy is supplied to electrode means 22a, 23a, by a removable electrical connector or terminal clip 24 that is connected to a suitable source of electrical energy and is extendable through an opening 25 provided in one of side wall portions 14, both electrically and mechanically to engage terminals 22b, 23b. One suitable source of energy is an automotive cigarette lighter socket (12 V D.C.), not shown, into which a plug 34 (FIG. 1) is insertable for supplying energy through parallel wire conductor means 34a connected to the terminal clip.

As is seen also to advantage in FIGS. 1, 4 and 5, terminal clip 24 is generally rectangular in its cross section, having a main body portion 27 of generally box shape and a wedge shaped portion 28 having its base coplanar with the base of portion 27. Across the top of body portion 27 is a projection 32 disposed and adapted, as is seen in FIG. 5, to be pushed past, and locked by abutting engagement with an inwardly pivotable flap 33 that initially extends (FIG. 1) over an upper portion of opening 25 in a side wall 14 of carton 10, upon sequential insertion of the wedge shaped portion 28 and the main body portion 27 through the opening 25. Access is gained to opening 25 by outward pivotation of a flap 35 (FIGS. 4 and 5) that initially extends over a lower portion of the opening (FIG. 1). Both flaps 33 and 35, and cut score lines therefor, conveniently are formed in a single die cutting operation. The terminal clip 24 includes paired upper and lower spring contacts 36, 36a, and 37, 37a as seen variously in FIGS. 1, 4 and 5. The upper contacts 36 and 37 are disposed and adapted both electrically and frictionally to engage terminal portions 22b, 23b of the bus bars upon insertion of the clip to its locked position. The lower contacts 36a, 37a frictionally engage the lower surface of corrugated panel 16 and enhance the described electrical engagement of the upper contacts 36, 37. Also in locked position of the clip, its lower base portion rests upon the bottom wall 13 of the carton, beneath the corrugated panel 16.

A sheet of poly-coated paper 29, such as, for example locker wrap, made up of layer 30 of paper and layer 31 of polyethylene as is seen in FIGS. 3 and 5, conveniently is adhered, for example by a known heat seal, along the far edge of aluminum layer 21 as viewed in FIG. 2. Sheet 29 extends over the heater, its electrodes and terminals, and the terminal clip, and slightly beyond the edge where electrical connection is made, so as to protect the underlying elements and aid in sealing opening 25, as is seen to advantage in FIG. 5.

In the method aspect of the invention, heater assembly 15 is formed by laminating a sheet of aluminum-metallized glassine 17 onto a blank for corrugated panel 16 by means of a layer of adhesive 18. One such adhesive found suitable for this purpose is available from the Morton Chemical Company under the trade designation Adcote 503H. Zinc metal is then are sprayed in a generally U-shaped strip along three edges of the metallized layer 21 of sheet 17. A generally rectangular notch or gap 26 (FIGS. 2, 4 and 5) is then die cut into panel 16, severing the interconnecting loop portion of the arc-sprayed zinc strip and the immediately underlying aluminum layer, followed by severing a portion of metallized layer 21 by making, for example, a knife or razor cut along a line designated generally by the numeral 38 and extending adjacent the loop portion of the strip to the side thereof between the spaced, confronting leg portions. Severing both the loop portion of the strip and the line portion of layer 21 transforms the strip portions 22a, 23a, into heater electrodes and portions 22b, 23b into heater electrode terminals. The line of severance 38 precludes flow of electric current directly from terminals 22b, 23b through metallized layer 21, ensuring flow instead through confronting spaced electrodes 22a, 23a and the portion of layer 21 therebetween.

In the disclosed preferred embodiment of the invention, the aluminum layer 23 is about 200 Angstrom units in thickness, the distance between electrodes 22a, 23a is about 12½ inches, and the dimension of layer 21 between razor cut 38 and its free edge is about 12½ inches. It has been found that application of about 12 volts D.C. to electrodes 22a, 23a, disposed on an aluminum layer 21 of the dimensions described, achieved a satisfactory hold-warm operating condition of about 78 Watts, or about ½ Watt per sq. inch of heater surface. Advantageously, the thermally reflective characteristic of layer 21, taken with the thermally insulative characteristic of corrugated panel 16, serve to maintain concentration of heat within the storage region of the carton atop heater assembly 15.

It will be appreciated that the invention affords improved heated package construction featured by its simple, inexpensive manufacture, and ready disposability upon use.

While preferred modes of laying down both the electrically resistive and electrically conductive materials have been disclosed, as well as preferred carton and heater base materials, it will be apparent to those skilled in the art that various changes and modifications can be made without departing from the scope of the appended claims.

We claim:

1. In the fabrication of electrical resistance heater means, the method comprising: forming a sheet of electrically resistive material; laying down a strip of electrically conductive material on said sheet of electrically resistive material, in such a pattern that said strip has mutually spaced substantially parallel portions and an interconnecting portion; and converting said parallel strip portions into electrode means for said electrically resistive material and said interconnecting strip portions into terminal means for said electrode means by severing said interconnecting portion and said resistive material underlying same, and severing said resistive material along a region adjacent said interconnecting strip portion and to the side thereof disposed between said parallel strip portions.

2. The method according to claim 1, and further characterized in that said step of forming a sheet of electrically resistive material comprises vacuum-metallizing a layer of a first metal onto a sheet of electrically insulative material, and said step of laying down a strip of electrically conductive material comprises arc-spraying a layer of a second metal onto said first metal layer.

3. The method according to claim 2 and further characterized in that said step of severing said interconnecting strip portion and said underlying resistive material is effected using die cutting procedures and the step of severing said resistive material is effected by a knife cutting procedure.

4. The method according to claim 3, wherein said first metal comprises aluminum and said second metal comprises zinc.

* * * * *